United States Patent [19]

Matsuda et al.

[11] Patent Number: 4,690,464
[45] Date of Patent: Sep. 1, 1987

[54] HYDRAULIC BRAKING PRESSURE CONTROL APPARATUS

[75] Inventors: Shohei Matsuda, Utsunomiya; Yoshihiro Iwakawa, Haga, both of Japan

[73] Assignee: Honda Giken Kogyo Kabushiki Kaisha, Japan

[21] Appl. No.: 802,120

[22] Filed: Nov. 25, 1985

[30] Foreign Application Priority Data

Jan. 24, 1985 [JP] Japan .................................. 60-11699

[51] Int. Cl.⁴ ............................................... B60T 8/14
[52] U.S. Cl. ..................................... 303/115; 188/299
[58] Field of Search ....................... 303/113, 115, 117; 188/299, 300

[56] References Cited

U.S. PATENT DOCUMENTS 3,722,960 3/1973 Von Lowis of Menar .... 303/115 X

FOREIGN PATENT DOCUMENTS 2023248 12/1979 United Kingdom ................ 303/115

*Primary Examiner*—Duane A. Reger
*Assistant Examiner*—Matthew C. Graham
*Attorney, Agent, or Firm*—Armstrong, Nikadio, Marmelstein & Kubovcik

[57] ABSTRACT

Hydraulic braking pressure device which includes a casing divided into a first cylinder portion and a second cylinder portion by a partition. A first piston is slidably fitted in the first cylinder portion and defines an input chamber between one end face thereof and the partition which is connectible to an output port of a master cylinder. The opposite end face of the first piston and the end of the first cylinder portion define a control chamber connectible with an anti-lock control mechanism. A second piston is slidable fitted in the second cylindrical portion and defines an output chamber between one end face thereof and the partition which is connectible to a wheel brake. The opposite end face of the second piston and the end of the second cylinder portion define a spring chamber in which a spring is housed biasing the second piston towards the partition. The first and second piston are fitted to both ends of a piston rod which penetrates movably and sealingly through the partition. A valve mechanism is provided in the partition and closes in response to movement of the second piston away from the partition cutting off communication between the input and output chambers. The sectional area of the first piston is smaller than that of the second piston.

4 Claims, 4 Drawing Figures

HYDRAULIC BRAKING PRESSURE CONTROL APPARATUS

BACKGROUND OF THE INVENTION

This invention relates to a hydraulic braking pressure control apparatus for vehicles, and more particularly to an apparatus having an input hydraulic chamber leading to an output port of a master cylinder, and an output hydraulic chamber communicating with a wheel brake and being adapted to generate a hydraulic braking pressure in accordance with a hydraulic pressure in the input hydraulic chamber, wherein the volume of the output hydraulic chamber can be increased in accordance with the supply of a hydraulic control pressure from an anti-lock control means to a control chamber when a wheel is about to be locked.

In a conventional hydraulic braking pressure control apparatus for vehicles of the kind described above, a piston is operated and moved in response to the introduction of hydraulic pressure into an input hydraulic chamber so as to reduce the volume of an output hydraulic chamber and thereby to generate a hydraulic braking pressure from the output hydraulic chamber in accordance with the pressure in the input hydraulic chamber. During anti-lock operation, the piston is displaced in a direction opposite to that in the above-mentioned case by means of a control liquid pressure supplied to a control chamber, thereby increasing the volume of the output hydraulic chamber.

In the conventional hydraulic braking pressure control apparatus, the hydraulic braking system is divided into two parts, one extending from a master cylinder to an input hydraulic chamber and the other extending from an output hydraulic chamber to a wheel brake. Therefore, when supplying working oil to the hydraulic system, it is necessary that working oil be supplied separately to these two parts.

Therefore, the assignee of the present invention has already proposed in U.S. application Ser. No. 755,502, filed July 16, 1985, now U.S. Pat. No. 4,627,670, dated Dec. 9, 1986. A hydraulic braking pressure control apparatus for vehicles, which unifies the hydraulic braking pressure system from the master cylinder to the wheel brake and makes it easy to supply working oil by disposing a first cylinder portion to which a first piston fits slidably, a second cylinder portion to which a second piston moving together with the first piston is fitted slidably, both of the first and second cylinder portions being disposed on the same axis while interposing a partition between them and a valve mechanism disposed in the partition between hydraulic input and output chambers and operative to be closed at the time of anti-lock control.

However, in this hydraulic braking pressure control apparatus described above, the valve closing operation of the valve mechanism is likely to be delayed at the start of the anti-lock control because the valve closing stroke of the valve body of the valve mechanism is relatively large. This problem can be solved by reducing the stroke of the valve body in the valve mechanism, but it is difficult to maintain accuracy when this is done.

OBJECT AND SUMMARY OF THE INVENTION

In view of the background described above, the present invention is directed to provide a hydraulic braking pressure control apparatus which actuates a valve body of a valve mechanism at a position close to a valve seat at the start of anti-lock control, and speeds up the valve closing operation of the valve mechanism.

In accordance with the present invention, there is provided a hydraulic braking pressure control apparatus for vehicles, including an input hydraulic chamber communicating with an output port of a master cylinder and an output hydraulic chamber communicating with a wheel brake and adapted to generate a hydraulic braking pressure corresponding to a hydraulic pressure in the input hydraulic chamber, the output hydraulic chamber being adapted to increase its volume in accordance with a control liquid pressure supplied from anti-lock control means to a control chamber when a wheel is about to be locked, wherein a first cylinder portion and a second cylinder portion are disposed on the same axis inside a casing with a partition interposed between them; a first piston is slidably fitted to the first cylinder portion so as to define the input hydraulic chamber on its side nearest to the partition and the control chamber on its opposite side to the partition; a second piston is slidably fitted to the second cylinder portion so as to define the output hydraulic chamber on its side nearest to the partition and a spring chamber on its side opposite to the partition; the first and second piston being fitted to both ends of a piston rod penetrating through the partition both hydraulically sealed and movably; a valve mechanism is provided in the partition and is operable to be closed in response to the movement of the second piston away from the partition, and cuts off the communication between the input and output hydraulic chambers; and a spring for biasing the second piston towards the partition is housed in the spring chamber; whereby the sectional area of the first piston is determined to be smaller than that of the second piston to such an extent that the occurrence of a proportional pressure drop action in the valve mechanism can be avoided.

According to the construction described above, since the sectional area of the first piston is somewhat different from that of the second piston, the first and second pistons frequently undergo displacement on both sides in the axial direction within a limited range at the time of a braking operation, and a valve body of a valve mechanism repeats a valve opening-closing operation close to a valve seat in response to the former. Therefore, the valve mechanism is closed rapidly at the start of anti-lock control.

BRIEF DESCRIPTION OF THE DRAWINGS

The above and other objects and the attendant advantages of the present invention will become readily apparent by reference to the following detailed descriptions when considered in conjunction with the accompanying drawings wherein:

FIG. 3 is a diagram showing the drop of a wheel speed at the start of anti-lock control, wherein

DETAILED DESCRIPTION OF A PREFERRED EMBODIMENT

Figure 1:
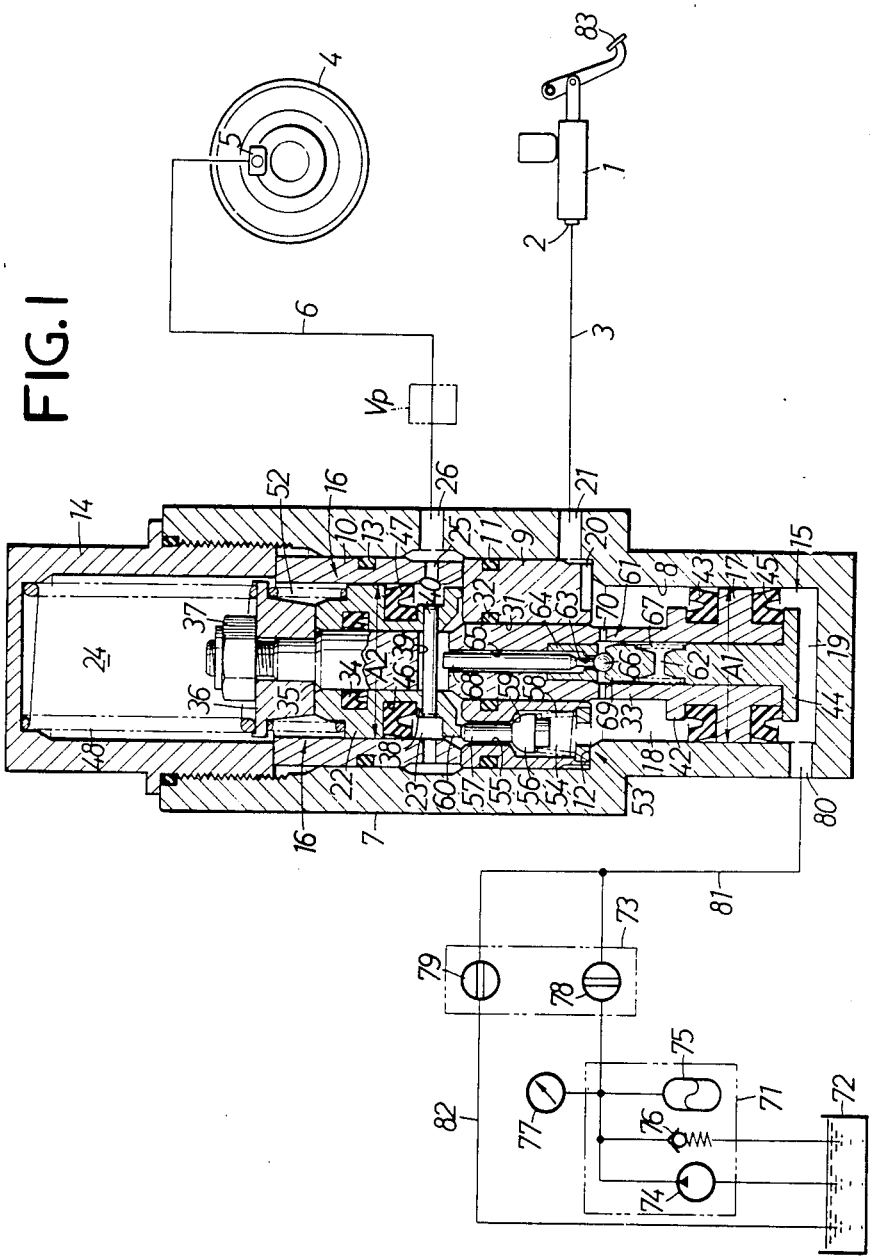
FIG. 1 is a longitudinal sectional view of the present invention.

Hereinafter, one embodiment of the present invention will be described with reference to the accompanying drawings. In FIG. 1, an oil passage 3 is connected to an output port 2 of a master cylinder 1, and another oil passage 6 is connected to a wheel brake 5 fitted to a wheel 4 having a relatively large support load. A casing 7 is disposed between these oil passages 3 and 6, and hydraulic braking pressure is supplied from the master cylinder 1 to the wheel brake 5. When the support load of the wheel 4 is relatively small, a proportional reducing valve Vp is disposed in either the oil passage 6 or 3 as represented by chain line in the drawing. The hydraulic braking pressure from the master cylinder 1 is thereby reduced proportionally and is then supplied to the wheel brake 5.

The casing 7 basically has the shape of a cylinder whose upper end is open. A disc-like partition 9 and a disc-like sleeve 10 are inserted in order named into a bore 8 that is formed inside the casing 7. The partition 9 is fitted into the bore 8 with an O-ring 11 between the partition and the inner surface of the bore 8, and strikes a step 12 that is formed at an intermediate portion of the bore 8 so as to face upward. The sleeve 10 is fitted into the bore 8 with an O-ring 13 between it and the inner surface of the bore 8, and comes into contact with the partition 9. The lid member 14 having the shape of a cylinder with one end open is screwed to the open end of the bore 8, and both the partition 9 and the sleeve 10 are clamped and fixed between the step 12 and the lid member 14 when the lid member 14 is fastened. The sleeve 10 may be shaped integrally with the partition 9.

The partition 9 and the sleeve 10 are fixed inside the bore 8. A first cylinder portion 15 below the partition 9 and a second cylinder portion 16 above the partition 9 are thus concentrically formed inside the casing 7.

A first piston 17 is slidably fitted in the first cylinder portion 15. The input hydraulic chamber 18 is defined between the first piston 17 and the partition 9, while a control chamber 19 is defined between the bottom of the casing 7 and the first piston 17. A notch is disposed on the side surface of the partition 9 facing the input hydraulic chamber 18 in order to define an oil passage 20 between the partition and the step 12. The oil passage 3 communicating with the master cylinder 1 is communicated with the input hydraulic chamber 18 through an input oil passage 21, that is formed on the side wall of the casing 7, and through the oil passage 20 described above.

A second piston 22 whose sectional area A2 is somewhat greater than the sectional area A1 of the first piston 17 is slidably fitted in the second cylinder portion 16. An output hydraulic chamber 23 is defined between the second piston 22 and the partition 9, while a spring chamber 24 is defined between the second piston 22 and the lid member 14. An oil passage 25 is formed on the sleeve 10 so as to always communicate with the output hydraulic chamber 23, and an output oil passage 26, which is formed on the side wall of the casing 7 in order to communicate with the oil passage 6 extending to the wheel brake 5, is communicated with the output hydraulic chamber 23 through the oil passage 25 described above.

A through-hole 31 is bored at the center of the partition in such a manner as to extend between the input and output hydraulic chambers 18 and 23. A piston rod 33 is slidably fitted into the through-hole 31 in the axial direction with an O-ring 32 between them. The first piston 17 described above is integrally disposed at a lower part of this piston rod 33, and the second piston 22 is fitted to an upper part of the piston rod 33 so as to be able to move relatively in the axial direction within a limited range with a seal member 34 interposed between them. A step 35 facing upward is disposed at an upper part of the piston rod 33, and a receiving member 36 coming into contact with this step 35 is fixed to the upper end of the piston rod 33 by a nut 37.

The second piston 22 is equipped integrally with a cylindrical portion 38 that extend towards the partition 9. An anchor hole 39 that always communicates with the output hydraulic chamber 23 is provided in the piston rod 33 in such a manner as to extend along one diameter line while corresponding to the cylindrical portion 38. Moreover, this anchor hole 39 has a transverse section shape which is elliptic with its major axis extending in the axial direction of the piston rod 33. A rod 40, one or both ends of which are fixed to the cylindrical portion 38 of the second piston 22, is inserted into the anchor hole 39. Therefore, the second piston 22 can move relative to the piston rod 33 within a permissible range in which the rod 40 can move in the axial direction of the piston rod 33 inside the anchor hole 39.

The piston rod 33 is equipped with a flange 42 at a position closer to the partition 9 than to the first piston 17 and comes into contact with the partition 9, thereby limiting the upward movement of the piston rod 33. A seal member 43 is fitted between the first piston 17 and the flange 42. Another seal member 45 is interposed between a blind lid 44, which is in turn fitted to the lower end of the piston rod 33, and the first piston 17. Both seal members 43, 45 come into sliding contact with the inner surface of the casing 7. A ring-like fitting groove 46 is defined at a portion of the second piston 22 close to the partition 9, and a seal member 47 coming into sliding contact with the inner surface of the sleeve 10 is fitted into this fitting groove 46.

A coil-like return spring 48 is fitted between the receiving member 36, that is, the piston rod 33, and the lid member 14, and biases the piston rod 33 downward, that is, in a direction where the first piston rod 17 moves away from the partition 9. A spring 52 whose set load is smaller than that of the return spring 48 is interposed between the receiving member 36, that is, the piston rod 33, and the second piston 22 so that it exhibits the spring force to relatively move the second piston 22 towards the partition 9.

A first valve mechanism 53 as a valve mechanism for opening and cutting off the communication between the input hydraulic chamber 18 and the output hydraulic chamber 23 is provided in the partition 9. This first valve mechanism 53 is equipped with a valve chamber 54 which is disposed in the partition 9 in such a manner as to communicate with the input hydraulic chamber 18, a valve hole 55 which is disposed so as to extend from the valve chamber 54 to the output hydraulic chamber 23, a spherical valve body 56 which is housed in the valve chamber 54 so as to open and close the valve hole 55, a driving rod 57 which faces the output hydraulic chamber 23 through the valve hole 55 and is integrated with the valve body 56, and a spring 58 which is housed in the valve chamber 54 and biases the valve body 56 towards the valve hole 55. A conical valve seat 59 whose diameter decreases progressively towards the valve hole 55 is disposed on the end surface of the valve chamber 54 on the side of the valve hole 55. The length of the driving rod 57 is set to a sufficient value so that when the second piston 22 undergoes maximum displacement toward the partition 9, it is pushed by a push portion 60 formed at the tip of the cylindrical portion 38 of the second piston rod 22 and moves the valve body 56 away from the valve seat 59.

A second valve mechanism 61 is disposed inside the piston rod 33. This second valve mechanism 61 is equipped with a valve chamber 62 which always communicates with the input hydraulic chamber 18, a cylindrical valve seat 64 which has a valve hole 63 concentric with the piston rod 33, a passage 65 which continues concentrically the valve hole 63 and communicates the valve hole 63 with the anchor hole 39, a spherical valve body 66 which is housed in the valve chamber 62 in such a manner as to open and close the valve hole 63, a spring 67 which biases the valve body 66 towards the valve hole 63, and a driving rod 68 which is inserted into the passage 65 and the valve hole 63 and can push the valve body 66 for opening the hole 63.

The valve chamber 62 is defined between the valve seat 64 and the blind lid 44 by inserting the valve seat 64 into a bottomed hole which is concentrically bored at the lower end of the piston rod 33 and closing the open end of the bottomed hole by the blind lid 44. Sealing between the valve chamber 62 and the passage 65 is established by tightly pushing and fixing the valve seat 64 into the bottomed hole, but a suitable seal member or the like may be interposed between the outer surface of the valve seat 64 and the inner surface of the bottomed hole.

A valve body receiver 69 which receives the valve body 66 is housed in the valve chamber 62 in such a manner as to be capable of moving in the axial direction of the piston rod 33. The spring 67 is interposed between the blind lid 44 and the valve body receiver 69. A communication hole 70 which communicates the valve chamber 62 with the input hydraulic chamber 18 is bored on the piston rod 33.

The length of the driving rod 68 is set so that when one of its ends is in contact with the valve body 66 in the closing state, the other end projects by a predetermined length into the anchor hole 39. Therefore, when the second piston 22 moves relatively away from the receiving member 36 in a direction approaching the partition 9 over a predetermined distance relative to the piston rod 33, the valve body 66 of the second valve mechanism 61 moves away from the valve seat 64 and opens the valve.

The control chamber 19, a control liquid pressureFg,15 source 71 and a reservoir 72 are connected to one another via anti-lock control means 73. The control liquid pressure source 71 consists of a hydraulic pressure pump 74 which sucks up a control liquid such as an operating oil, for example, from the reservoir 72, an accumulator 75 and a relief valve 76. The hydraulic pressure pump 74 is actuated as necessary when the vehicle is driven. A hydraulic pressure sensor 77 is additionally fitted to the control liquid pressure source 71 in order to detect trouble in the hydraulic pressure pump 74, to detect the hydraulic pressure and to start and stop driving the hydraulic pressure pump 74.

The anti-lock control means 73 consists of a first electromagnetic valve 78 which is normally closed, and a second electromagnetic valve 79 which is normally open. When the brakes of the vehicle are about to be locked, the second electromagnetic valve 79 is first driven closed, and the first electromagnetic valve 78 is then driven open. The first electromagnetic valve 78 is disposed at an intermediate portion of an oil supply passage 81 which is connected to an oil passage 80 formed on the side wall at the lower portion of the casing 7 and communicates the control liquid pressure source 71 with the control chamber 19. The second electromagnetic valve 79 is disposed at an intermediate portion of a return oil passage 82 which branches from the supply oil passage 81 between the first electromagnetic valve 78 and the control chamber 19 and extends to the reservoir 72.

Next, the operation of this embodiment will be described. At the time of non-braking operation without the operation of a brake pedal 83 under the normal operating condition, the piston rod 33 is moved downward by the spring force of the return spring 48, and the second piston 22 is in contact with the partition 9. Therefore, in the first valve mechanism 53, the driving rod 57 is pushed by the push portion 60 of the second piston 22, and the valve body 56 is away from the valve seat 59, thereby opening the valve. Accordingly, a hydraulic pressure passage is formed which extends from the output port 2 of the master cylinder 1 to the wheel brake 5 through the oil passage 3, the input oil passage 21, the oil passage 20, the input hydraulic pressure chamber 18, the valve chamber 54, the valve hole 55, the output hydraulic pressure chamber 23, the oil passage 25, the output oil passage 26 and the oil passage 6.

This arrangement makes it extremely easy to charge the operating oil of the control hydraulic pressure system in the same way as a brake hydraulic pressure device which is not equipped with a hydraulic braking pressure control device for anti-lock control. In other words, it has been necessary in accordance with the prior art to separately charge the operating oil to a hydraulic pressure passage from the master cylinder 1 to the input hydraulic chamber 18 and to a hydraulic pressure passage from the output hydraulic chamber 23 to the wheel brake 5. However, since the braking hydraulic pressure passage from the master cylinder 1 to the wheel brake 5 is established in this embodiment, the charging of the operating oil can be finished by charging the operating oil from the side of the master cylinder 1.

When braking is effected by the brake pedal 83, the braking hydraulic pressure from the output port 2 of the master cylinder 1 is supplied to the wheel brake 5 through the hydraulic pressure passage describe above. In this case, since the control hydraulic pressure is not supplied to the control chamber 19 from the control hydraulic pressure source 71, the downward force due to the oil pressure P1 from the input hydraulic chamber 18 and the spring force of the spring 48 acts upon the piston rod 33, while the upward force due to the oil pressure P2 of the output hydraulic chamber 23 act upon the piston rod 33. Therefore, the hydraulic pressure of the input hydraulic chamber 18 is supplied as such to the output hydraulic chamber 23 and is further supplied to the wheel brake 5 until these downward and upward forces match each other.

In other words, the first valve mechanism 53 is kept open until the following formula (1) is satisfied:

$$(A1-A3-A4)\times P1 + F = (A2-A3-A4)\times P2 \quad (1)$$

where:

F: set load of spring 48,

A1: sectional area of first piston 17,
A2: sectional area of second piston 22,
A3: sectional area of piston rod 33,
A4: sectional area of valve hole 55 of first valve mechanism 53.

Figure 2:
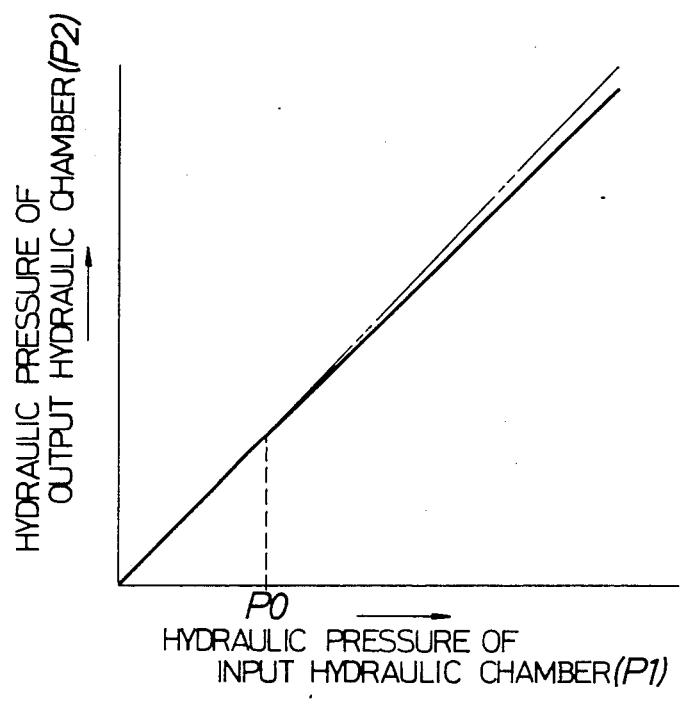
FIG. 2 is a diagram showing the relation between the hydraulic pressure of an input hydraulic pressure chamber and that hydraulic pressure of an output hydraulic pressure chamber.

When the hydraulic pressure P1 of the input hydraulic pressure chamber 18 rises after the formula (1) has been satisfied, the valve body 56 of the first valve mechanism 53 repeats the valve opening and closing operations at a position close to the valve seat 59. In other words, until the hydraulic pressure P1 of the input hydraulic chamber 18 reaches P0 in FIG. 2, P2=P1. When the former increases beyond P0, however, the valve body 56 causes the valve opening and closing operations in response to the upward and downward movement of the piston rod 33, and the hydraulic pressure P2 of the output hydraulic chamber 23 takes the value expressed by the following formula (2):

$$P2 = P1 \times [(A1 - A3 - A4)/(A2 - A3 - A4)] \quad (2)$$

Here, since A1 is somewhat smaller than A2, the pressure reducing ratio of the hydraulic pressure P2 of the output hydraulic chamber 23 to the hydraulic pressure P1 of the input hydraulic chamber 18 is extremely small, and the valve body 56 frequently repeats opening and closing the valve at a position close to the valve seat 59.

When the braking force becomes excessive at the time of the brake operation and the wheel 4 enters the locked state, the second electromagnetic valve 79 is first closed, and the first electromagnetic valve 78 is then opened. Therefore, the anti-lock control liquid pressure is supplied from the control liquid pressure source 71 to the control chamber 19, whereby the first piston 17 and the piston rod 33 are moved upward against the downward force by the return spring 48 and the hydraulic pressure of the input hydraulic pressure chamber 18. In this instance, the second piston 22 moves upwards together with the piston rod 33 while being kept in contact with the receiving member 36 until the upward force due to the hydraulic pressure of the output hydraulic chamber 23 balances with the downward force of the spring 52, and along therewith, the second piston 22 moves away from the partition 9. Therefore, the valve body 56 is seated on the valve seat 59 of the first valve mechanism 53, thereby closing the valve, cutting off the supply of the braking oil pressure to the wheel brake 5 and increasing the volume of the output hydraulic pressure chamber 23. As a result, the braking oil pressure decreases and the wheel 4 is prevented from entering the locked state.

Figure 3A:
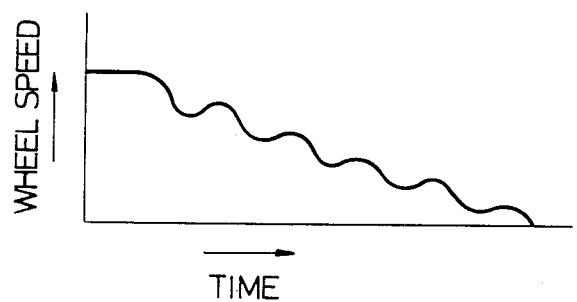
FIG. 3A shows the drop in the present invention and FIG. 3B shows the drop in the prior art.
Figure 3B:
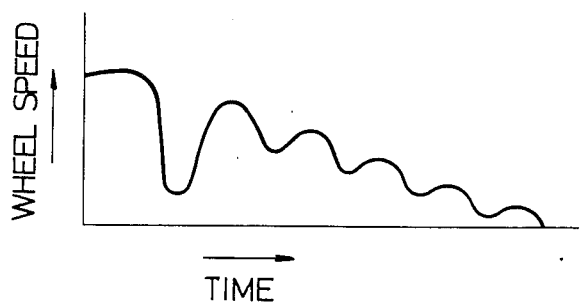

At the time of this anti-lock control, the valve body 56 is situated at a position close to the valve seat 59 so that the first valve mechanism 53 is closed as rapidly as possible, and the wheel speed at the start of the anti-lock control drops gradually as shown in FIG. 3(A), thereby exhibiting suitable anti-lock control. In contrast, in the prior art apparatus, the delay of the valve closing operation occurs in the first valve mechanism 53 at the start of the anti-lock control as shown in FIG. 3(B), and the wheel speed drops drastically.

Turning back again to FIG. 2, the delay of the valve closing operation of the first valve mechanism 53 is unavoidable if the anti-lock control is effected before the hydraulic pressure P1 of the input hydraulic chamber 18 reaches P0, but P0 can be minimized to a level at which no practical problem occurs, by adjusting the ratio of the cross-sectional areas A1 and A2 and the set load of the spring 48.

Next, the operation at the time of the excessive anti-lock control such as when a vehicle drives on a hazardous road or at the time of trouble of the control liquid pressure source will be explained. First of all, during the non-braking operation, the first piston 17 and the piston rod 33 move upward with the increase of the control liquid pressure inside the control chamber 19 against the spring force of the return spring 48, but the upward movement of the second piston 22 is restricted by the spring 52 and the second piston 22 moves downward relative to the piston rod 33. Accordingly, in the second valve mechanism 61, the rod 40 which is integral with the second piston 22 pushes the driving rod 68 so that the valve body 66 moves away from the valve seat 64 and opens the valve. In consequence, the input hydraulic chamber 18 is communicated with the output hydraulic chamber 23, and the internal pressure of the chamber 23 is prevented from reaching a negative pressure that will cause trouble in practice. In this case, the relative movement between the second piston 22 and the piston rod 33 is permitted until the rod 40 comes into contact with the side wall of the anchor hole 39, and thereafter the second piston 22 moves upward together with the piston rod 33.

If braking is effected in the state described above, the braking hydraulic pressure that has been supplied from the master cylinder 1 to the input hydraulic chamber 18 is introduced into the output hydraulic chamber 23 through the second valve mechanism 61 and acts upon the wheel brake 5 through the passage 6. In this instance, if the force of the upward movement of the second piston 22 due to the hydraulic pressure of the output hydraulic chamber 23 is greater than the force of the downward movement due to the spring force of the spring 52, the second piston 22 keeps moving relative to the piston rod 33 until these forces balance with each other, thereby effecting the same operation as the operation at the time of braking described above.

Next, it will be assumed that the control liquid pressure inside the control chamber rises abnormally at the time of the braking operation. In this case, the piston rod 33 moves upward and along therewith, the second piston 22 moves upward together with the piston rod 33 until the force of the upward movement due to the hydraulic pressure of the output hydraulic chamber 23 balances the force of the downward movement due to the spring force of the spring 52. When the piston rod 33 moves further upward, the second piston 22 moves downward relative to the piston rod 33 due to the drop of the hydraulic pressure of the output hydraulic chamber 23, and the second valve mechanism 61 causes the valve to open. In this manner, the hydraulic pressure inside the output hydraulic chamber 23 is prevented from dropping to a negative pressure which would create problems in practice. Since an excessive oil quantity greater than the necessary oil quantity to be excluded from the input hydraulic chamber 18 for the suitable anti-lock control is introduced into the output hydraulic chamber 23, recoil which is more excessive than that necessary for the anti-lock control does not occur in the brake pedal 83.

As described above, in accordance with the present invention, the first and second cylinder portions are disposed inside the casing on the same axis while interposing the partition between them, the first piston which forms the input hydraulic chamber on the side of the partition and the control chamber on the opposite side to the partition is fitted slidably to the first cylinder portion, the second piston forming the output hydraulic chamber on the side of the partition and the spring chamber on the opposite side to the partition is fitted slidable to the second cylinder portion, the first and second pistons are mounted respectively to both ends of the piston rod penetrating liquid-tight and movably through the partition, the partition is provided with the valve mechanism which closes the valve in response to the movement of the second piston away from the partition and cuts off the communication between the input hydraulic chamber and the output hydraulic chamber, and the spring that biases the second piston towards the partition is housed in the spring chamber. Therefore, when the control liquid pressure is not supplied to the control chamber, the valve mechanism is opened to define the oil passage extending from the master cylinder to the wheel brake, so that the operating oil can be charged at once to the braking oil pressure system.

The sectional area of the first piston is determined to be smaller than that of the second piston so that the occurrence of the proportional pressure reducing action in the valve mechanism can be prevented. This arrangement makes it possible to let the valve body of the valve mechanism open and close the valve at a position close to the valve seat at the start of the anti-lock control, and to rapidly close the valve mechanism concurrently with the start of the anti-lock control.

It is readily apparent that the above-described hydraulic braking pressure control apparatus for vehicles meets all of the objects mentioned above and also has the advantage of wide commercial utility. It should be understood that the specific form of the invention hereinabove described is intended to be representative only, as certain modification within the scope of these teachings will be apparent to those skilled in the art.

Accordingly, reference should be made to the following claim in determining the full scope of the invention.

What is claimed is:

1. A hydraulic braking pressure control apparatus for vehicles, comprising:

a casing;

a first cylinder portion and a second cylinder portion disposed on the same axis inside the casing;

a partition interposed between the first cylinder portion and the second cylinder portion;

a first piston slidably fitted in said first cylinder portion defining an input hydraulic chamber, communicating with an output port of a master cylinder, on one side of said partition and a control chamber on the opposite side to said partition;

a second piston slidably fitted in said second cylinder portion defining on one side thereof nearest to said partition an output hydraulic chamber communicating with wheel brake and adapted to generate a hydraulic braking pressure corresponding to a hydraulic pressure in said input hydraulic chamber and a spring chamber on an opposite side thereof farthest from said partition;

said output hydraulic chamber being adapted to increase its volume in accordane with a control liquid pressure supplied from anti-lock control means to said control chamber when a wheel is about to be locked;

said first and second pistons being mounted to both ends of a piston rod penetrating through said partition and hydraulically sealed therewith and movably therethrough;

a valve mechanism provided in said partition and operable to be closed in response to the movement of said second piston away from said partition, thereby cutting off the communication between said input and output hydraulic chamber; and a spring housed in said spring chamber for biasing said second piston toward said partition;

the sectional area of said first piston being smaller than that of said second piston so that the occurrence of a proportional pressure reduction action in said valve mechanism is avoided.

2. An apparatus according to claim 1, wherein the hydraulic pressure in said input hydraulic chamber is directly fed to the output hydraulic chamber through the valve mechanism kept in open state when the hydraulic pressure is below a preset level and, when said hydraulic pressure reaches and exceeds said preset level, said hydraulic pressure is fed into the output hydraulic chamber without being substantially reduced through the valve mechanism which then repeats opening and closing operations caused by a difference in sectional area between said first and second pistons.

3. An apparatus according to claim 2, wherein said preset level of said hydraulic pressure is a level obtained when a force urging the piston rod in a direction in which the second piston approaches said partition and a force urging the rod in an opposite direction in which the second piston moves away from the partition balance each other.

4. An apparatus according to any one of claims 1, 2 or 3 wherein a proportional reducing valve is disposed in one of the passages connecting between the master cylinder and the input hydraulic chamber and between the output hydraulic chamber and the wheel brake.

* * * * *